United States Patent [19]

Fatica

[11] 4,144,381
[45] Mar. 13, 1979

[54] ELECTROCHEMICAL PH CONTROL

[75] Inventor: Nicholas Fatica, Cleveland, Ohio

[73] Assignee: Energy Development Associates, Madison Hgts., Mich.

[21] Appl. No.: 834,960

[22] Filed: Sep. 20, 1977

[51] Int. Cl.² .......................................... H01M 10/36
[52] U.S. Cl. ....................................... 429/50; 429/105
[58] Field of Search ................ 204/128, 129; 429/17, 429/19, 50, 51, 101, 105

[56] References Cited

U.S. PATENT DOCUMENTS

| 3,630,778 | 12/1971 | Kreidl et al. | 429/50 |
| 3,713,888 | 1/1973 | Symons | 429/51 |
| 3,904,496 | 9/1975 | Harke et al. | 204/129 |

Primary Examiner—Howard S. Williams
Attorney, Agent, or Firm—Ostrolenk, Faber, Gerb & Soffen

[57] ABSTRACT

The pH of an electrolyte used in an electrochemical reaction in which hydrogen is generated is controlled by converting at least a portion of the hydrogen generated into an electrolyte soluble form.

9 Claims, No Drawings 4,144,381

ELECTROCHEMICAL PH CONTROL

BACKGROUND OF THE INVENTION

In most electrochemical reactions, including all such reactions in which an aqueous electrolyte is used, hydrogen is generated either as a principal product of the reaction or as the result of a parasitic reaction. Conventionally, such generated hydrogen is periodically or continuously purged from the electrochemical system.

Many electrochemical reactions are pH dependent, at least to some extent. For example, either the reaction itself or the efficiency of the reaction may be dependent on the pH. When an acid pH is desired, it is conventional to add an appropriate acid to the electrolyte or, if the electrolyte inherently has the desired pH, to continuously conduct the reaction with fresh electrolyte in order to maintain the desired acid value.

One well known electrochemical reaction is the electrolytic dissociation of an aqueous zinc chloride electrolyte into zinc and chlorine. This reaction has been utilized in a secondary battery system as described in Symons U.S. Pat. No. 3,713,888, which is hereby incorporated by reference. During the charging of the secondary battery, zinc plates out on one electrode and chlorine is generated at the other electrode. Symons then stores the halogen generated for use in discharging of the battery system in the form of a halogen hydrate.

During operation of the Symons battery system, hydrogen is coproduced during the charging of the battery. The gas has been periodically or continuously purged. Such purging has been found to be undesirable, however, because chlorine is also lost along with the hydrogen and has to be replaced, the lost chlorine also presents a disposal problem, and the loss of hydrogen from the system increases the pH of the electrolyte. The pH increase had a number of particularly undesirable consequences. For example, when the pH increased to greater than 2.5, the morphology of the deposited zinc was adversely affected resulting in a gray, spongy material in contrast to the dense crystaline zinc formed at a pH of 0–1.5. The spongy zinc tends to grow faster and develop dendrites earlier than the crystalline deposit, thereby reducing the coulombic as well as the energy storage capacity of the battery system. Additionally, as the pH rises, the hydroxyl ion concentration also rises making it easier to discharge $OH^-$ at the chlorine electrode and to generate oxygen, a significant portion of which immediately oxidizes the graphite electrode used. The graphite grain boundaries are especially susceptible to attack, resulting in erosion and disintergration of the electrode structure and thereby drastically reducing the life of the chlorine electrode. It was apparent that there was a need for a means to conveniently maintain and control the pH of the electrolyte.

It is the object of this invention to provide a simple, convenient and effective means of maintaining the pH of an electrolyte in an electrochemical system at a desired level. This and other objects of the invention will become apparent to those skilled in the art from the following detailed description.

SUMMARY OF THE INVENTION

This invention relates to a method of controlling electrolyte pH in an electrochemical reaction and more particularly to controlling the pH in reactions where hydrogen is generated by converting at least a portion of the generated hydrogen into an electrolyte soluble form.

DESCRIPTION OF THE INVENTION

The pH control desired by this invention is accomplished by the relatively simple expedient of causing the generated hydrogen to redissolve in the electrolyte. Since the hydrogen is generated as a result of the combination of two hydrogen ions during the electrochemical reaction, it is apparent that the hydrogen must be reacted with another material in order to convert it into soluble form. The reactant with which the hydrogen reacts can be inherently present in the electrochemical system or can be added for the specific purpose of the reaction.

In the zinc chloride electrochemical reaction referred to above, both hydrogen and halogen are generated during charging. It is therefore very convenient to react the two to form HCl which is water soluble. The hydrogen-chlorine reaction can be catalyzed by any convenient means and a particularly preferred means is the use of ultraviolet light. The conversion can be effected at the site of the electrochemical reaction or in a separate area. In electrochemical systems using circulating electrolyte, it is usually more convenient to effect the conversion in the separate area.

It will be appreciated that the degree of conversion of the generated hydrogen to an electrolyte soluble form can be controlled to any desired level.

As an example of the application of the present invention, an electrical energy storage system constructed in accordance with the aforesaid Symons U.S. Pat. No. 3,713,888. The system contains three zones, the first of which was the electrode zone containing graphite electrodes. The electrolyte solution used, a 25 weight percent aqueous zinc chloride solution, was caused to flow between the electrode zone and a reservoir zone. The battery was charged by imposing an electric current across the electrodes thereby causing zinc to deposit at the negative electrode, a halogen gas to form at the positive electrode, and hydrogen to form at the negative electrode. Since the electrolyte solution was flowing through the electrode area, the halogen and hydrogen gases formed were carried out of this zone with the electrolyte. Periodic purging of the hydrogen from the reservoir was effected. To discharge the battery, the electric source was disconnected and a resistance load substituted therefor. The reservoir was interconnected with a halogen hydrate storage zone.

The temperature of this third zone was maintained sufficiently low to cause solidification of halogen hydrate while the electrolyte remained a liquid and suitable means for separating and storing the halogen hydrate was provided.

The Symons system was then modified to eliminate the purging of the hydrogen gas during operation, i.e. to operate as a completely closed system, and an ultraviolet light was installed within the reservoir. The electrode area in this system contained three cells, i.e., three pairs of electrodes. The electrochemical system just described was operated for about 150 hours with about 70 charge/discharge cycles at 95% depth of discharge and approximately 65% efficiency. It was found that the pH remained almost uniformly at 0.1 throughout this period. It was noted that the zinc formed was dense and crystalline and there was very low, if any, oxidation of the graphite electrodes.

It will be apparent to those skilled in the art that the instant invention has broad applicability and is not limited to the zinc chloride electrochemical system described above. The invention is thus broadly applicable to any electrochemical system in which the generated hydrogen can be converted into an electrolyte soluble form so as to maintain a desired pH. Such systems include, for example, the hydrogen halide and sodium halide systems. Similarly, while the hydrogen can be converted by reaction with a foreign substance, it is convenient when the hydrogen can be made to combine with a product of the electrochemical reaction such as halogen, and particularly chlorine and bromine. Additionally, the invention is not limited to the use of ultraviolet light as a means for catalyzing the hydrogen conversion into a soluble form.

It will thus be appreciated that various changes and modifications can be made in the process of this invention without departing from the spirit and scope thereof. The various embodiments described herein were for the purpose of illustration only and were not intended to limit the invention.

What is claimed is:

1. A method for controlling electrolyte pH in an electrochemical battery system in which hydrogen is generated which comprises converting at least a portion of the generated hydrogen into a hydrogen halide which is not a principal reactant in said system, and dissolving said hydrogen halide in said electrolyte.

2. The method of claim 1 wherein said electrolyte is an aqueous electrolyte.

3. The method of claim 2 wherein the hydrogen generated is not purged from the electrochemical reaction system.

4. The method of claim 1 wherein said hydrogen is converted by reaction with chlorine to form hydrogen chloride.

5. The method of claim 4 wherein said electrolyte is an aqueous zinc chloride solution.

6. The method of claim 4 wherein said chlorine is generated by said electrochemical reaction.

7. The method of claim 4 wherein said hydrogen chlorine reaction is effected in the presence of ultraviolet light.

8. The method of claim 1 wherein said conversion is effected in a zone maintained apart from the place of hydrogen generation.

9. The method of claim 1 wherein said hydrogen is converted by reaction with another substance to form an electrolyte soluble reaction product.

* * * * *